(12) United States Patent
Hsieh et al.

(10) Patent No.: US 9,603,136 B2
(45) Date of Patent: Mar. 21, 2017

(54) CONTROL CHANNEL ALLOCATION METHOD, CONTROL CHANNEL SEARCHING METHOD AND COMMUNICATION APPARATUS USING THE SAME

(71) Applicant: Industrial Technology Research Institute, Hsinchu (TW)

(72) Inventors: Chia-Wen Hsieh, Chiayi (TW); Chien-Min Lee, New Taipei (TW); Ren-Jr Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/086,992

(22) Filed: Nov. 22, 2013

(65) Prior Publication Data

US 2014/0078998 A1 Mar. 20, 2014

Related U.S. Application Data

(62) Division of application No. 13/114,066, filed on May 24, 2011, now abandoned.

(Continued)

(51) Int. Cl.
*H04W 4/00* (2009.01)
*H04W 72/04* (2009.01)
(Continued)

(52) U.S. Cl.
CPC ......... *H04W 72/042* (2013.01); *H04L 1/0046* (2013.01); *H04L 1/0061* (2013.01);
(Continued)

(58) Field of Classification Search
None
See application file for complete search history.

(56) References Cited

U.S. PATENT DOCUMENTS

2009/0300456 A1* 12/2009 Pelletier et al. ............. 714/749
2010/0061345 A1  3/2010 Wengerter et al.
(Continued)

FOREIGN PATENT DOCUMENTS

| CN | 101505498 | 8/2009 |
| CN | 101610564 | 12/2009 |

(Continued)

OTHER PUBLICATIONS

"Office Action of Taiwan Counterpart Application", issued on Aug. 22, 2014, p. 1-p. 14.

(Continued)

*Primary Examiner* — Zewdu A Beyen
(74) *Attorney, Agent, or Firm* — Jianq Chyun IP Office

(57) ABSTRACT

UE-specific search spaces (UE-SS) for a carrier-aggregated communication system are introduced to decrease the number of blind decoding attempts, decrease downlink control information (DCI) blocking probability, and maintain good blind decoding performance. In the proposed control channel allocation method, the control channel searching method and the communication apparatus thereof, the UE-specific search spaces are extended except control channel element (CCE) aggregation level one. Further, a new CCE aggregation level is created in the UE-specific search spaces. The sum of the number of control channel candidates for all aggregation levels is bounded by the maximum number of PDCCH candidates. In addition, uplink MIMO grant command is just allocated in a pre-configured component carrier or a set of pre-configured component carriers, but uplink MIMO grant command is not allocated in the remaining component carriers.

18 Claims, 16 Drawing Sheets

Related U.S. Application Data

(60) Provisional application No. 61/348,705, filed on May 26, 2010, provisional application No. 61/351,170, filed on Jun. 3, 2010.

(51) Int. Cl.
  *H04L 1/00* (2006.01)
  *H04L 5/00* (2006.01)

(52) U.S. Cl.
  CPC ............ *H04L 1/0072* (2013.01); *H04L 5/001* (2013.01); *H04L 5/0053* (2013.01)

(56) References Cited

U.S. PATENT DOCUMENTS

| | | | |
|---|---|---|---|
| 2010/0098012 A1 | 4/2010 | Bala et al. | |
| 2010/0279628 A1* | 11/2010 | Love | H04L 5/0091 455/70 |
| 2010/0303011 A1* | 12/2010 | Pan et al. | 370/328 |
| 2011/0070845 A1* | 3/2011 | Chen et al. | 455/91 |
| 2011/0267978 A1* | 11/2011 | Etemad | H04L 5/003 370/254 |

FOREIGN PATENT DOCUMENTS

| | | |
|---|---|---|
| WO | 2009040653 | 4/2009 |
| WO | 2009041779 | 4/2009 |
| WO | 2009074611 | 6/2009 |

OTHER PUBLICATIONS

"Office Action of Taiwan Counterpart Application," issued on Dec. 22, 2015, p. 1-p. 5.

"Office Action of China Counterpart Application," issued on Feb. 29, 2016, p. 1-p. 5.

* cited by examiner

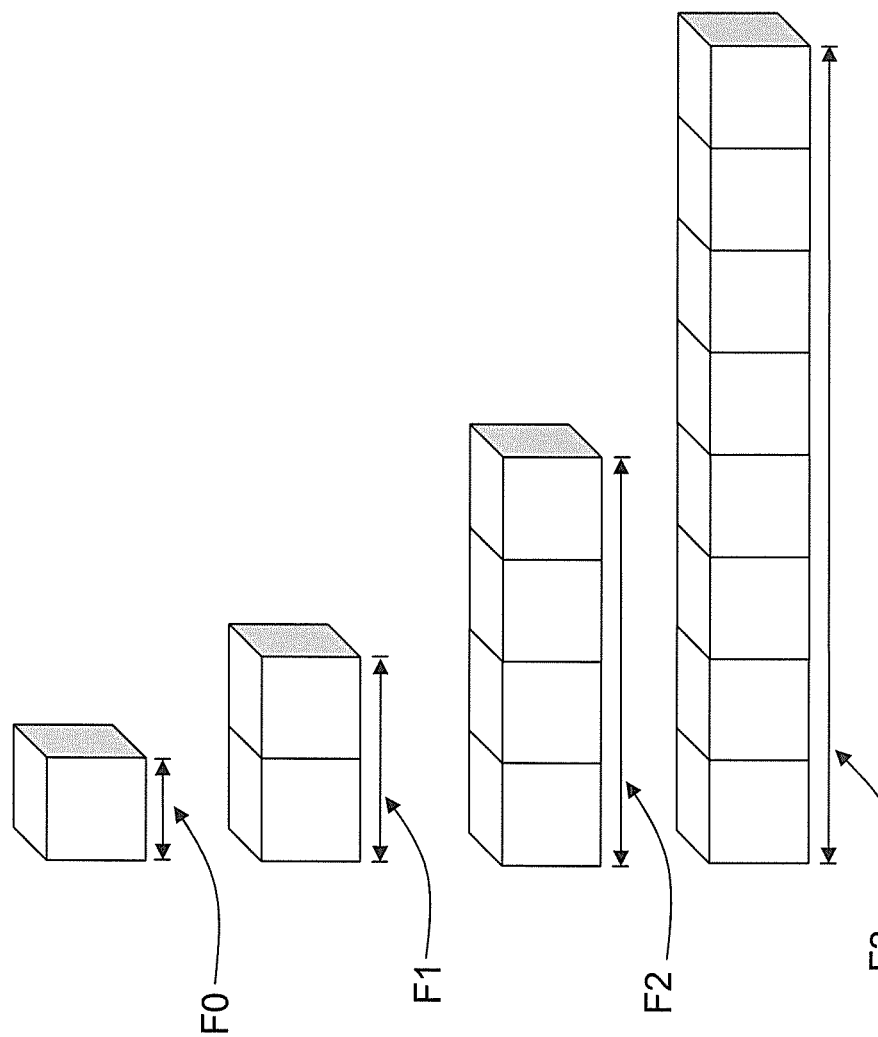

CONTROL CHANNEL ALLOCATION METHOD, CONTROL CHANNEL SEARCHING METHOD AND COMMUNICATION APPARATUS USING THE SAME

CROSS-REFERENCE TO RELATED APPLICATION

This application is a divisional application of and claims the priority benefit of U.S. application Ser. No. 13/114,066, filed on May 24, 2011, now pending, which claims the priority benefit of U.S. provisional application Ser. No. 61/348,705, filed on May 26, 2010 and U.S. provisional application Ser. No. 61/351,170, filed on Jun. 3, 2010. The entirety of each of the above-mentioned patent applications is hereby incorporated by reference herein and made a part of this specification.

TECHNICAL FIELD

The disclosure generally relates to a control channel allocation method, a control channel searching method and communication apparatuses using the same methods involved with allocating of user equipment (UE) specific downlink control information (DCI) in a UE-specific search space, or searching UE-specific DCI in a UE-specific search space.

BACKGROUND

A base station (also called an eNodeB) in a communication system such as Third Generation Partnership Project Long Term Evolution (3GPP LTE) system transmits downlink information to a user equipment (UE) through physical downlink control channel (PDCCH). Multiple PDCCHs can be transmitted in a subframe. Downlink control information (DCI) is carried by PDCCH, and is employed to transport at least downlink scheduling information or uplink scheduling information.

A DCI transports downlink or uplink scheduling information, or uplink power control commands for one RNTI (radio network temporary identifier). The RNTI is implicitly encoded in CRC (cyclic redundancy check), and each UE is assigned a unique RNTI, which can be UE unique identifier. There are two types of downlink control information in LTE system: common DCI and UE-specific DCI. The common DCI is for all UEs, and the UE-specific DCI is for a specific UE. With two types of downlink control information, each of them has its own search spaces such as common search spaces and UE-specific search spaces.

FIG. 1A is a schematic diagram illustrating a control region 11 in a subframe 10. Referring to FIG. 1A, the control region 11 is usually allocated from the beginning of the subframe 10. The control region 11 consists of a set of control channel elements (CCE) in a PDCCH, for example, 35 CCEs. Each of the CCEs (such as CCE 113) consists of 72 bits, and the CCE is the smallest unit of a control region as specified in 3GPP LTE release-8 standard. Usually, the size of the control region in a subframe is increased with the system bandwidth. In other words, the greater the system bandwidth is, the larger the control region will be. The control region 11 includes a common search space 112, in which UEs search for common DCI. The UE-specific search spaces depend on the UE unique identifier and may overlap with common search space, in which UE-specific DCIs can be allocated.

Only the initial positions for search spaces can be known. For common search space, the initial positions are the first CCE of control region. For UE-specific search space, the initial positions can be obtained by a predetermined HASH function of the UE unique identifier. Thus, the search spaces refer to the region in which the UE attempts to decode a number of PDCCH candidates. In other words, each UE shall monitor a set of PDCCH candidates for control information in every non-discontinuous reception (DRX) subframe. Each UE monitoring implies a blind decoding attempt to decode a DCI in the set of PDCCH candidates according to all the monitoring DCI formats. The DCI formats that the UE shall monitor depend on the configured transmission mode. For 3GPP LTE release-8 standard, each UE shall monitor two DCI payload sizes while the transmission mode is given.

TABLE 1

| | Supported PDCCH formats | |
|---|---|---|
| PDCCH Format | Number of CCEs (Aggregation level) | Number of PDCCH bits |
| 0 | 1 | 72 |
| 1 | 2 | 144 |
| 2 | 4 | 288 |
| 3 | 8 | 576 |

FIG. 1B is a schematic diagram illustrating PDCCH formats in a single component carrier system. Referring to FIG. 1B, the PDCCH format 0 (labeled as F0) consists of 1 CCE; the PDCCH format 1 (labeled as F1) consists of 2 CCEs; the PDCCH format 2 (labeled as F2) consists of 4 CCEs; the PDCCH format 3 (labeled as F3) consists of 8 CCEs. The PDCCH format 0, 1, 2, 3 can also be referred to aggregation levels 1, 2, 4, 8.

FIG. 1C is a schematic diagram illustrating common search space 112 and corresponding PDCCH candidates in a single component carrier system. Referring to FIG. 1C, for example, the common search space 112 consists of 16 CCEs (numbered from 0 to 15), and any common DCI may be encoded into an aggregation level 4 or an aggregation level 8 according to the 3GPP LTE release-8 standard. Each UE shall monitor a set of PDCCH candidates at each of aggregation levels 4 and 8 in common search space (C-SS). The set of common PDCCH candidates is the same for all UEs. In other words, common search space is independent of UE unique identifier.

The common control region consists of a set of CCEs. For example, there are 16 CCEs (equivalent to 1,152 bits) in the common control region, numbered form 0 to 15. There are 4 PDCCH candidates at aggregation level 4 such as a first candidate 131, a second candidate 132, a third candidate 133, a fourth candidate 134 (shown in FIG. 1C), and 2 PDCCH candidates at aggregation level 8 such as a first candidate 135, a second candidate 136 (shown in FIG. 1C). The initial position starts form CCE 0 at both aggregation levels. The set of PDCCH candidates in common search space is shown in FIG. 1C. The aggregation levels defining the C-SS are listed in Table 2 below. There are total 6 PDCCH candidates in the common search space.

TABLE 2

PDCCH candidates monitored by a UE in Common Search Space

| Type | Common Search Space Aggregation level (L) | Size (in CCEs) | Number of PDCCH candidates |
|---|---|---|---|
| Common | 4 | 16 | 4 |
|  | 8 | 16 | 2 |

On the other hand, a UE-specific DCI may be encoded into an aggregation level 1, an aggregation level 2, an aggregation level 4 or an aggregation level 8 according to the 3GPP LTE release-8 standard. Each UE shall monitor a set of PDCCH candidates at aggregation level 1, 2, 4 and 8 in the UE-specific search space (UE-SS). The set of UE-specific PDCCH candidates varies with UE unique identifier and the slot number within a radio frame. In other words, the initial positions of UE-specific search space vary from UE to UE.

FIG. 1D is a schematic diagram illustrating UE-specific search space and its corresponding PDCCH candidates in a single carrier system. There are 6 PDCCH candidates at aggregation level 1 such as a first candidate 141, a second candidate 142, a third candidate 143, a fourth candidate 144, a fifth candidate 145, a sixth candidate 146 (shown in FIG. 1D). There are 6 PDCCH candidates at aggregation level 2 such as a first candidate 151, a second candidate 152, a third candidate 153, a fourth candidate 154, a fifth candidate 155, a sixth candidate 156 (shown in FIG. 1D). There are 2 PDCCH candidates at aggregation level 4 such as a first candidate 161, a second candidate 162. There are 2 PDCCH candidates at aggregation level 8 such as a first candidate 171, a second candidate 172. Therefore, the UE-specific search space consists of a set of 6 CCEs at aggregation level 1, 12 CCEs at aggregation level 2, 8 CCEs at aggregation level 4, and 16 CCEs at aggregation level 8. The set of PDCCH candidates in UE-specific search space is shown in FIG. 1D.

Each UE shall monitor one C-SS at each of aggregation levels 4 and 8 and one UE-SS at each of aggregation levels 1, 2, 4, 8. The C-SS and UE-SS may overlap. The aggregation levels defining the UE-SS are listed in Table 3. There are total 16 (6+6+2+2) PDCCH candidates in the UE-SS. It is noted that, in the conventional approach, the search spaces are defined in Table 2 and Table 3.

TABLE 3

PDCCH candidates monitored by a UE in UE-specific Search Space

| Type | UE-Specific Search Space Aggregation level | Size (in CCEs) | Number of PDCCH candidates |
|---|---|---|---|
| UE-specific | 1 | 6 | 6 |
|  | 2 | 12 | 6 |
|  | 4 | 8 | 2 |
|  | 8 | 16 | 2 |

Each UE monitors a set of PDCCH candidates in C-SS and UE-SS. Each monitoring implies an attempt to decode control information in the monitoring set. For 3GPP LTE release-8 standard, each UE shall monitoring two DCI payload sizes (or two possible types of codeword lengths) at each PDCCH candidate. Therefore, the maximum number of blind decoding attempts is 12 (6*2) for C-SS and 32 (16*2) for UE-SS. Then, each UE is required to operate a maximum of 44 (12+32) blind decoding for the control region, as shown in Table 4.

TABLE 4

The maximum number of blind decodes in single carrier systems

| Type | Maximum number of blind detections | Aggregation level | Number of PDCCH candidates |
|---|---|---|---|
| Common | 12 = (4 + 2) * 2 | 4 | 4 |
|  |  | 8 | 2 |
| UE-specific | 32 = (6 + 6 + 2 + 2) * 2 | 1 | 6 |
|  |  | 2 | 6 |
|  |  | 4 | 2 |
|  |  | 8 | 2 |
| C-SS + UE-SS | 44 = 12 + 32 | — | — |

Usually, the higher the aggregation level (at which DCI is encoded to more CCEs), the better protection capability it can be achieved. Therefore, the higher aggregation level further lowers decoding error probability. Lower decoding error probability leads to better DCI decoding performance. However, when one DCI for a UE is encoded into more CCEs, there may be higher DCI blocking probability for other UEs.

For 3GPP LTE release-8 system, all communications are carried out in the single bandwidth system. However, carrier aggregation (CA) technology is approved to support high data rate transmission over wide frequency bandwidth and increase channel capacity in next generation communication systems (e.g., 3GPP LTE-Advanced). CA technology composes multiple component carriers in contiguous or non-contiguous frequency band. For multiple component carriers (multi-CC) systems, cross-component carrier (cross-CC) PDCCH scheduling shall be supported for higher data rate transmission. In multi-CC systems, UE shall monitor separate PDCCHs in different component carriers. Each component carrier carries has its own control region. Thus, the cross-CC scheduling will increase the number of blind decoding attempts.

The set of PDCCH candidates to be monitored is defined in term of search spaces in every non-DRX subframe, where a search space at an aggregation level is defined by the set of PDCCH candidates. The initial positions of UE-SS can be determined by hash function of the slot number within a radio subframe and the RNTI value used for the UE, where the RNTI value used for the UE is UE unique identifier.

Multiple component carriers systems will support new transmission schemes and new DCI fields. Therefore, the existing DCI formats may be appended with new fields for multi-CC systems. The new DCI formats support new features, such as enhanced downlink eight antennas transmission and uplink single user MIMO (SU-MIMO). The payload sizes of new DCI formats may not be aligned with the existing DCI payload size. In other words, the number of DCI payload sizes for a UE to monitor may be more than 2 if the new DCI payload size is not aligned with the existing DCI payload sizes. The maximum number of blind decoding attempts may be increased while the new DCI payload size is not aligned with the existing DCI payload sizes.

The maximum number of blind decoding will also be increased with the number of aggregated downlink component carriers, regardless of the maximum supported bandwidth of the UE. In single bandwidth systems, up to 44 blind decoding attempts are required for the control region. When the number of component carriers is increased by up to five, the number of blind decoding will be increased linearly to 220 (44×5) without introducing any new DCI payload size.

Although CA technology can dramatically increase transmission bandwidth and consequent data transmission rate, the maximum number of blind decoding attempts will also be increased linearly with the number of component carriers and the new DCI payload size. When cross-CC scheduling is enabled, the existing DCI formats will be increased by at least 3-bit carrier indicator field (CIF). Since the DCI payload sizes are getting larger, the coding rate will be getting higher at a fixed aggregation level. The higher coding rate implies the lower performance gain. Therefore, it is a major concern to find an approach to lower DCI blocking probability, keep the number of DCI blind decoding fewer, while maintain good DCI decoding performance.

SUMMARY

A control channel allocation method in a communication system with multiple component carriers is introduced herein. According to an exemplary embodiment, the control channel allocation method includes following procedures. It is determined to encode a UE-specific DCI into one of aggregation levels $l_1$, $l_2$, $l_3$, $l_4$ and $l_5$ according to at least system bandwidth, UE signal-to-noise ratio or signal-to-interference-plus-noise-ratio requirement on corresponding transmission mode. The encoded UE-specific DCI is allocated in the UE-specific search spaces a, b, c, d and e corresponding to the aggregation levels $l_1$, $l_2$, $l_3$, $l_4$ and $l_5$. In addition, the subframe including the allocated UE-specific DCI is transmitted.

A control channel allocation method in a communication system with multiple component carriers is introduced herein. According to an exemplary embodiment, the control channel allocation method includes following procedures. It is determined to encode a UE-specific DCI into one of aggregation levels $l_1$, $l_2$, $l_3$ and $l_4$, according to system bandwidth, UE signal-to-noise ratio or signal-to-interference-plus-noise-ratio requirement on corresponding transmission mode. The encoded UE-specific DCI is allocated in the UE-specific search space a, b, c and d corresponding to the aggregation levels $l_1$, $l_2$, $l_3$ and $l_4$. The subframe including the allocated UE-specific DCI is transmitted.

A control channel searching method in a communication system with multiple component carriers is introduced herein. According to an exemplary embodiment, the control channel searching method is applied for a UE to search for UE-specific DCI in a subframe from a base station, and includes the following procedures. A control region is received from the base station. It is determined to search a UE-specific DCI in the UE-specific search space a, b, c, d and e corresponding to aggregation levels $l_1$, $l_2$, $l_3$, $l_4$ and $l_5$. In addition, the UE-specific DCI in the subframe is decoded by the monitoring DCI formats depending on transmission mode.

A control channel searching method in a communication system with multiple component carriers is introduced herein. According to an exemplary embodiment, the control channel searching method is applied for a UE to search for UE-specific DCI in a subframe from a base station, and includes the following procedures. A control region is received from the base station. It is determined to search a UE-specific DCI in the UE-specific search space a, b, c, and d corresponding to aggregation level $l_1$, $l_2$, $l_3$ and $l_4$. In addition, the UE-specific DCI in the subframe is decoded by the monitoring DCI formats depending on transmission mode.

A control channel allocation method is introduced herein. According to an exemplary embodiment, the control channel allocation method is applied to allocate uplink MIMO grant command in a communication system with multiple component carriers and includes the following procedures. Uplink MIMO grant command is allocated just in a first set of component carriers but no uplink MIMO grant command is allocated in a second set of component carriers, where the second set of component carriers includes at least one component carrier.

A control channel searching method is introduced herein. According to an exemplary embodiment, the control channel searching method is applied to for a UE to search uplink MIMO grant command in a communication system with multiple component carriers, and includes the following procedures. Uplink MIMO grant command is just decoded in a first set of component carriers but no uplink MIMO grant command is decoded in a second set of component carriers, where the second set of component carriers includes at least one component carrier.

A communication apparatus is introduced herein. According to an exemplary embodiment, the communication apparatus includes a determination unit, a protocol stack module, and a transceiver module. The determination unit is configured for determining to encode a UE-specific DCI into one of aggregation levels $l_1$, $l_2$, $l_3$, $l_4$ and $l_5$ according to system bandwidth, UE signal-to-noise ratio or signal-to-interference-plus-noise ratio requirement on corresponding transmission mode. The protocol stack module is connected to the determination unit, and is configured for allocating the encoded UE-specific DCI in the UE-specific search spaces a, b, c, d and e corresponding to the aggregation levels $l_1$, $l_2$, $l_3$, $l_4$ and $l_5$. In addition, the transceiver module is connected to the protocol stack module, and is configured for transmitting multi-component-carrier signal comprising the allocated UE-specific DCI.

A communication apparatus is introduced herein. According to an exemplary embodiment, the communication apparatus includes a determination unit, a protocol stack module, and a transceiver module. The determination unit is configured for determining to encode a UE-specific DCI into one of aggregation levels $l_1$, $l_2$, $l_3$ and $l_4$ according to system bandwidth, UE signal-to-noise ratio or signal-to-interference-plus-noise-ratio requirement on corresponding transmission mode. The protocol stack module is connected to the determination unit, and is configured for allocating the encoded UE-specific DCI in the UE-specific search spaces a, b, c and d corresponding to the aggregation levels $l_1$, $l_2$, $l_3$ and $l_4$. In addition, the transceiver module is connected to the protocol stack module, and is configured for transmitting multi-component-carrier signal comprising the allocated UE-specific DCI.

A communication apparatus is introduced herein. According to an exemplary embodiment, the communication apparatus includes a protocol stack module and a transceiver module. The protocol stack module is configured for allocating uplink MIMO grant command just in a first set of component carriers but allocating no uplink MIMO grant command in a second set of component carriers, where the second set of component carriers includes at least one component carrier. In addition, the transceiver module is connected to the protocol stack module, and is configured for transmitting multi-component-carrier signal comprising the allocated uplink MIMO grant command.

A communication apparatus is introduced herein. According to an exemplary embodiment, the communication apparatus is applied to search UE-specific DCI in a subframe from a base station in a communication system with multiple component carriers and includes a transceiver module, a protocol stack module, a determination unit, and a decoding unit. The transceiver module is configured for receiving multi-component-carrier signal including the UE-specific DCI from the base station. The protocol stack module is connected to the transceiver module, and is configured for storing the received signal of the UE-specific search spaces. The determination unit is connected to the protocol stack module, and is configured for determining to decode the UE-specific DCI format in the UE-specific search spaces a, b, c, d and e corresponding to the aggregation levels $l_1$, $l_2$, $l_3$, $l_4$ and $l_5$. In addition, the decoding unit is connected to the determination unit, and decodes the UE-specific DCI by using the monitoring DCI formats, where the monitoring DCI formats are depending on transmission mode.

A communication apparatus is introduced herein. According to an exemplary embodiment, the communication apparatus is applied to search UE-specific DCI in a subframe from a base station in a communication system with multi-component-carriers and includes a transceiver module, a protocol stack module, a determination unit, and a decoding unit. The transceiver module is configured for receiving multi-component-carrier signal comprising the UE-specific DCI from the base station. The protocol stack module is connected to the transceiver module, and is configured for storing the UE-specific search space in the subframe. The determination unit is connected to the protocol stack module, and is configured for searching the UE-specific DCI in the UE-specific search spaces a, b, c, and d corresponding to the aggregation levels $l_1$, $l_2$, $l_3$, and $l_4$. In addition, the decoding unit is connected to the determination unit, and is configured for determining to decode a UE-specific DCI in the subframe by the monitoring DCI formats depending on transmission mode.

A communication apparatus is introduced herein. According to an exemplary embodiment, the communication apparatus is applied to search uplink MIMO grant command in a subframe from a base station in a communication system with multiple component carriers and includes a transceiver module and a protocol stack module. The transceiver module is configured for receiving multi-component-carrier signal including the uplink MIMO grant command from the base station. In addition, the protocol stack module is configured for monitoring uplink MIMO grant command just in a first set of component carriers but the protocol stack module does not monitoring uplink MIMO grant command in a second set of component carriers, where the second set of component carriers includes at least one component carrier.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1B is a schematic diagram illustrating PDCCH formats in a single component carrier system.

DETAILED DESCRIPTION

Figure 1A:
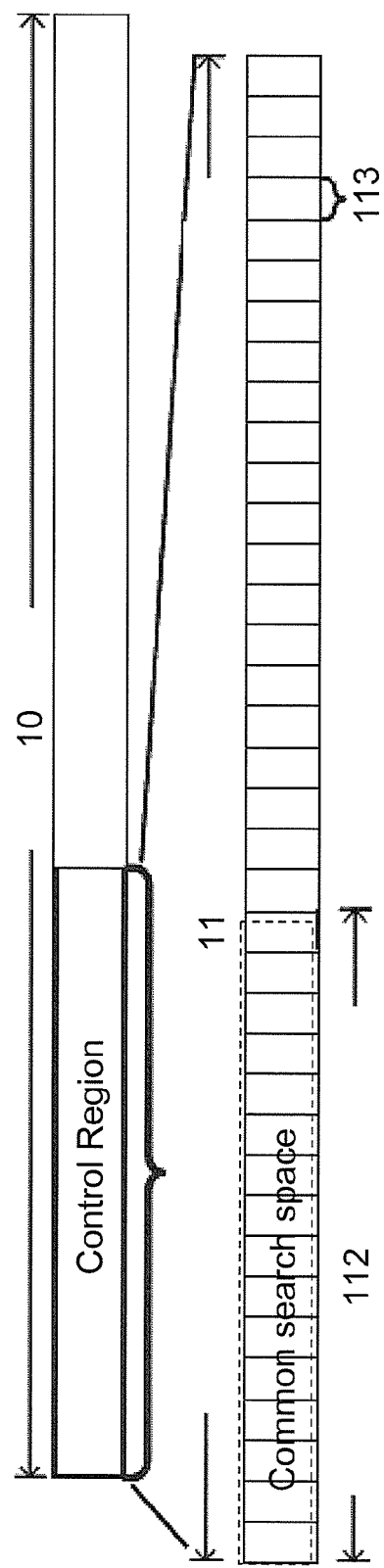
FIG. 1A is a schematic diagram illustrating a control region in a subframe.
Figure 1C:
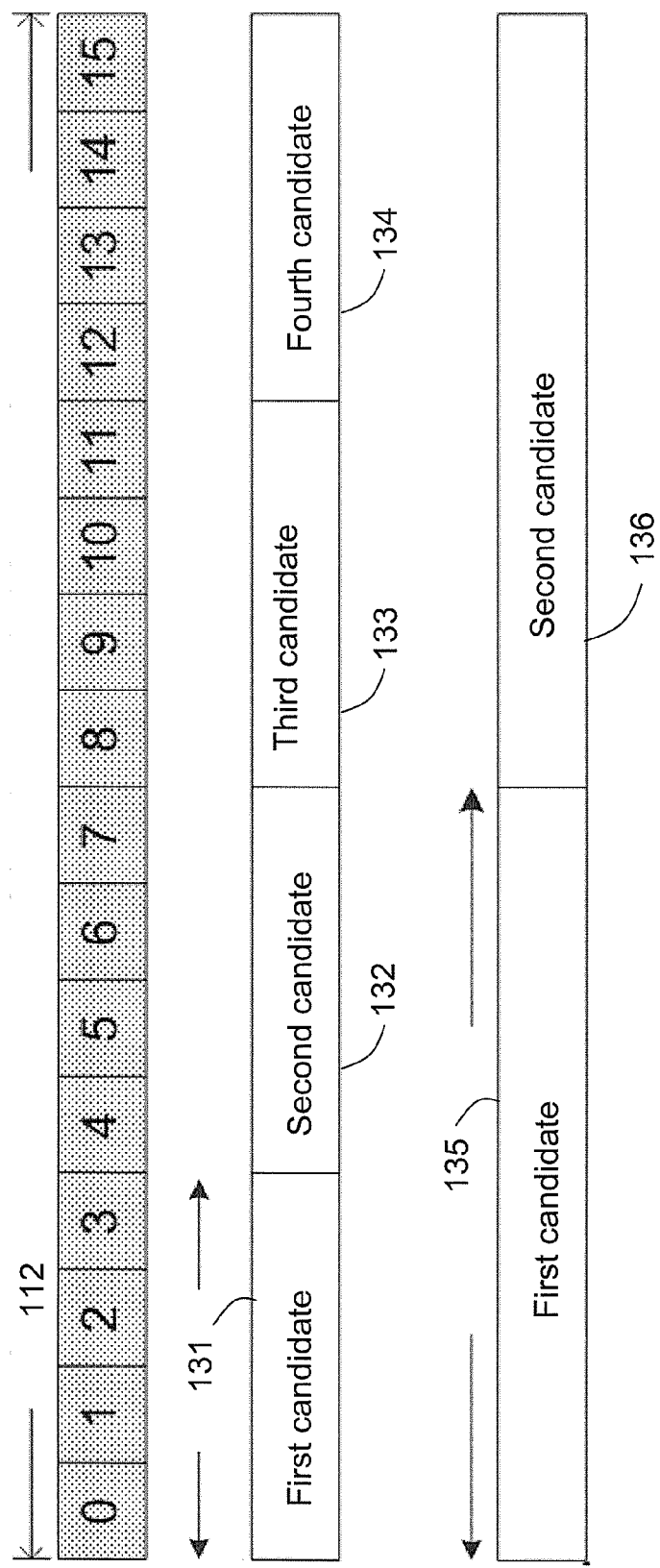
FIG. 1C is a schematic diagram illustrating common search space and corresponding PDCCH candidates in a single component carrier system.
Figure 1D:
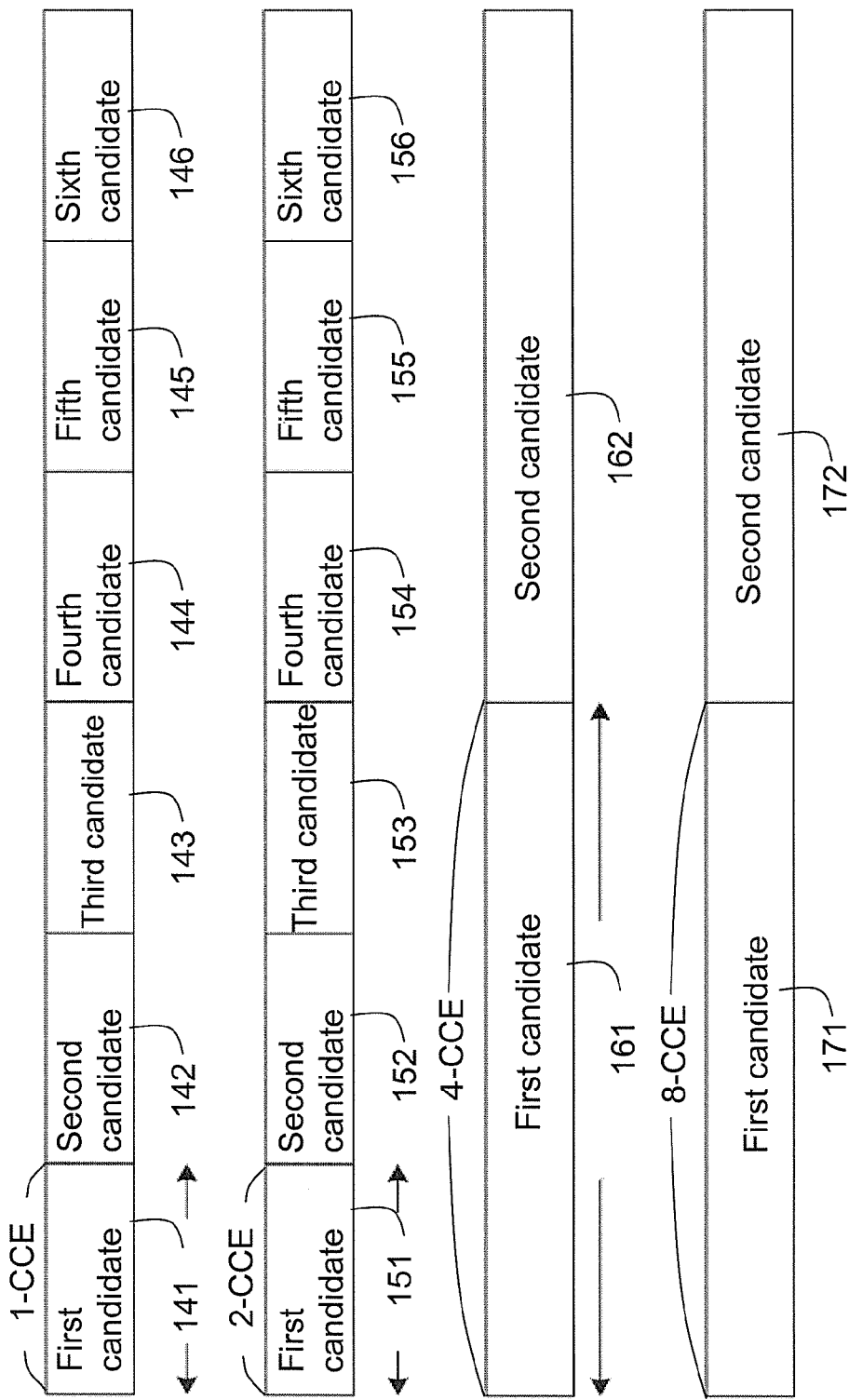
FIG. 1D is a schematic diagram illustrating UE-specific search space and its corresponding PDCCH candidates in a single component carrier system.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

In the present disclosure, there is proposed a control channel allocation method, a control channel searching method and communication apparatuses using the same methods. The control channel allocation method could be applied for a base station to allocate UE-specific DCI in a UE-specific search space. The control channel searching method can be applied for a UE to search its own UE-specific DCI in a UE-specific search space. The control channel allocation method can determine to encode a UE-specific DCI into one of aggregation level $l_1$, $l_2$, $l_3$, $l_4$, $l_5$ according to system bandwidth, UE signal-to-noise ratio (SNR) requirement or UE signal-to-interference-plus-noise ratio (SINR) requirement on corresponding transmission mode. The encoded UE-specific DCI is allocated in the UE-specific search space (a, b, c, d, e) corresponding to the aggregation level ($l_1$, $l_2$, $l_3$, $l_4$, $l_5$). The control channel searching method can decode a UE-specific DCI in a UE-specific search space (a, b, c, d, e) corresponding to the aggregation level ($l_1$, $l_2$, $l_3$, $l_4$, $l_5$).

Throughout the present disclosure, the base station can refer to an enhanced node B (eNodeB), an advanced base station (ABS), a marco-cell base station, a pico-cell base station, or a remote radio head (RRH). Moreover, the UE can refer to a mobile station, an advanced mobile station (AMS), or a wireless terminal communication device. In addition, the UE can be, for example, a mobile phone, a smartphone, a personal computer (PC), a notebook PC, a netbook PC, a tablet PC, a television, a set-top-box, a wireless data modem, a game console, a portable device, a portable multimedia player and so forth.

The new DCI monitoring formats include DCI of new transmission schemes (e.g., uplink MIMO) and existing DCI appended with new fields (e.g., 3-bit carrier indicator field). The number of information bits for new DCI monitoring formats is greater than that for the existing DCI monitoring formats. With the respect, PDCCH candidates at different aggregation levels should be carefully designed.

In the present disclosure, the control channel allocation method and the control channel searching method can be applied to new DCI monitoring format which has not been specified in LTE release-8 standard. The proposed control channel allocation method and the control channel searching method could decrease the number of blind decode attempts, decrease blocking probability of control information, and increase coding perform lance. The control channel allocation method and the control channel searching method could also be applied to the new DCI payload size reusing the LTE release-8 UE-specific search spaces. Before the exemplary embodiments are introduced, related issues regarding carrier aggregation (CA) and multiple-input-multiple-output (MIMO) uplink grant command in UE-specific search space are briefly discussed.

In this disclosure, exemplary embodiments will be introduced to increase the efficiency of DCI blind decoding when CA technology and the new DCI monitoring formats are supported by communication system, for example, LTE release-10 system.

[First Exemplary Embodiment]

In the first exemplary embodiment, the number of candidates at aggregation level one in UE-specific search space is decreased. The DCI payload size of the new DCI monitoring format is greater than that of the existing DCI monitoring format. While the DCI information length is getting greater, it requires higher SNR to achieve the same coding performance. For the above reasons, the number of candidates at aggregation level one can be decreased to reduce the number of blind decoding attempts. Throughout the present disclosure, the aggregation level 1 refers to the PDCCH format 0 where the DCI is encoded to 1 CCE; the aggregation level 2 refers to the PDCCH format 1 where the DCI is encoded to 2 CCEs; the aggregation level 4 refers to the PDCCH format 2 where the DCI is encoded to 4 CCEs; the aggregation level 8 refers to the PDCCH format 3 where the DCI is encoded to 8 CCEs. Also, the aggregation level 1, the aggregation level 2, the aggregation level 4, and the aggregation level 8 can also be called a first aggregation level, a second aggregation level, a third aggregation level, and a fourth aggregation level.

Since the aggregation level 1 may not achieve a reasonable coding performance in SNR requirement for practical usage and it also takes six times of blind decoding attempts, it is proposed in the first exemplary embodiment that the number of locations in UE-specific search space should be reduced for the aggregation level 1. The reduction of search space will also reduce the number of blind decoding attempts, as shown in Table 5 below. The initial points of PDCCH candidates can be derived from any hash function, for example, the hash function defined in LTE release-8 standard. In Table 5, a is the number of PDCCH candidates at the aggregation level 1, b is the number of PDCCH candidates at the aggregation level 2, c is the number of PDCCH candidates at the aggregation level 4, d is the number of PDCCH candidates at the aggregation level 8.

TABLE 5

Reduction of the UE-specific search space with CCE aggregation level one

| Type | Additional Blind Decoding for new format DCI | Aggregation level | Number of PDCCH candidates |
|---|---|---|---|
| UE-specific | a + 10 (a + 6 + 2 + 2) | 1 | a, a ∈ {0, 1, 2, 3, 4, 5} |
| | | 2 | 6 |
| | | 4 | 2 |
| | | 8 | 2 |

[Second Exemplary Embodiment]

In the second exemplary embodiment, at least one of the numbers of candidates at the aggregation levels 2 or 4 or 8 in UE-specific search space is increased. In other words, the numbers of candidates at the aggregation levels 2, 4, 8 in UE-specific search space could be all increased. Since the aggregation level 1 introduces higher error rate, the number of candidates at the aggregation level 1 is attempted to be decreased. However, the reductions on monitoring numbers of the UE-specific search space with the aggregation level 1 will increase the DCI blocking probability of new format control information. There is required other approaches to decrease the DCI blocking probability.

To decrease the blocking probability, the UE-specific search space can be extended except the aggregation level 1. The extensions can be shown in Table 6 below, where $N_{BD}$ is the maximum number of PDCCH candidates for new format DCI (for example, $N_{BD}$=16). These extended UE-specific search spaces do not increase the decoding error probability. Also, the number of blind decoding can be reduced if a+b+c+d<$N_{BD}$, where a is the number of PDCCH candidates at the aggregation level 1, b is the number of PDCCH candidates at the aggregation level 2, c is the number of PDCCH candidates at the aggregation level 4, and d is the number of PDCCH candidates at the aggregation level 8. Some examples of the extended UE-specific search spaces are shown in Table 6.

TABLE 6

Extension of the UE-specific search space except aggregation level one

| Type | Number of total PDCCH candidates for new DCI format | Aggregation level | Number of PDCCH candidates |
|---|---|---|---|
| UE-specific | a + b + c + d (a + b + c + d ≤ $N_{BD}$) | 1 | a, a ∈ {0, 1, 2, 3, 4, 5} |
| | | 2 | b, b ≥ 0 |
| | | 4 | c, c ≥ 0 |
| | | 8 | d, d ≥ 0 |

In Table 6, the number of PDCCH candidates in the UE-specific search space for the aggregation level 1 can be selected from a set of 0, 1, 2, 3, 4, 5. The initial points of PDCCH candidates can be derived from any hash function, for example, the hash function defined in LTE release-8 standard. The values of b, c, d can be any non-negative integers, but restricted to the condition where $a+b+c+d \leq N_{BD}$.

An example of reduction on locations in UE-specific search spaces with the aggregation level 1 is to reduce the number of PDCCH candidates for all aggregation levels in the UE-specific space respectively as (a, b, c, d)=(0, 6, 2, 2), as Option 1 shown in Table 7 below. Table 7 also lists simulation results in terms of the number of blind decoding required and the DCI blocking probability respectively for Options 1-Options 6. The assumption in the simulation is that the aggregation level of each DCI is given by random assignment, while the number of UEs receiving DCI is assigned as 5, and the total number of CCEs in the control region is assigned as 30. Also, the simulation parameters are configured as each of 5 UEs receives one DCI, and the cell ID and the slot number for UE-specific DCI are given by random selection.

TABLE 7

Simulation Result for First Exemplary Embodiment

| Number of positions in UE-search space for new DCI format | Number of total PDCCH candidates in UE-SS for new DCI format | Blocking probability (per DCI) |
|---|---|---|
| 3GPP LTE Release 8: {6, 6, 2, 2} | 16 | 0.004 |
| Option 1: {0, 6, 2, 2} | 10 | 0.014 |
| Option 2: {0, 8, 2, 2} | 12 | 0.006 |
| Option 3: {0, 6, 4, 2} | 12 | 0.007 |
| Option 4: {0, 8, 4, 2} | 14 | 0.003 |
| Option 5: {0, 6, 6, 2} | 14 | 0.002 |
| Option 6: {0, 8, 6, 2} | 16 | 0.001 |

The one of ordinary skill in the art should understand the Options 1-Options 6 in Table 7 above make the control channel allocation at the base station or the control channel searching more flexible than the conventional approach where the values of (a, b, c, d) is fixed as (6, 6, 2, 2) specified in LTE release-8 standard. Also, the UE-specific search space of the aggregation level 1 is reduced to zero in all Options 1-Options 6. As can be seen from Table 7, the number of blind decoding required for all Options 1 -Options 6 are less than or equal to that for the conventional approach. The Options 4 -Options 6 in the first exemplary embodiment can achieve lower blocking probability, fewer blind decoding attempts and better coding performance than that for the conventional approach.

Figure 2:
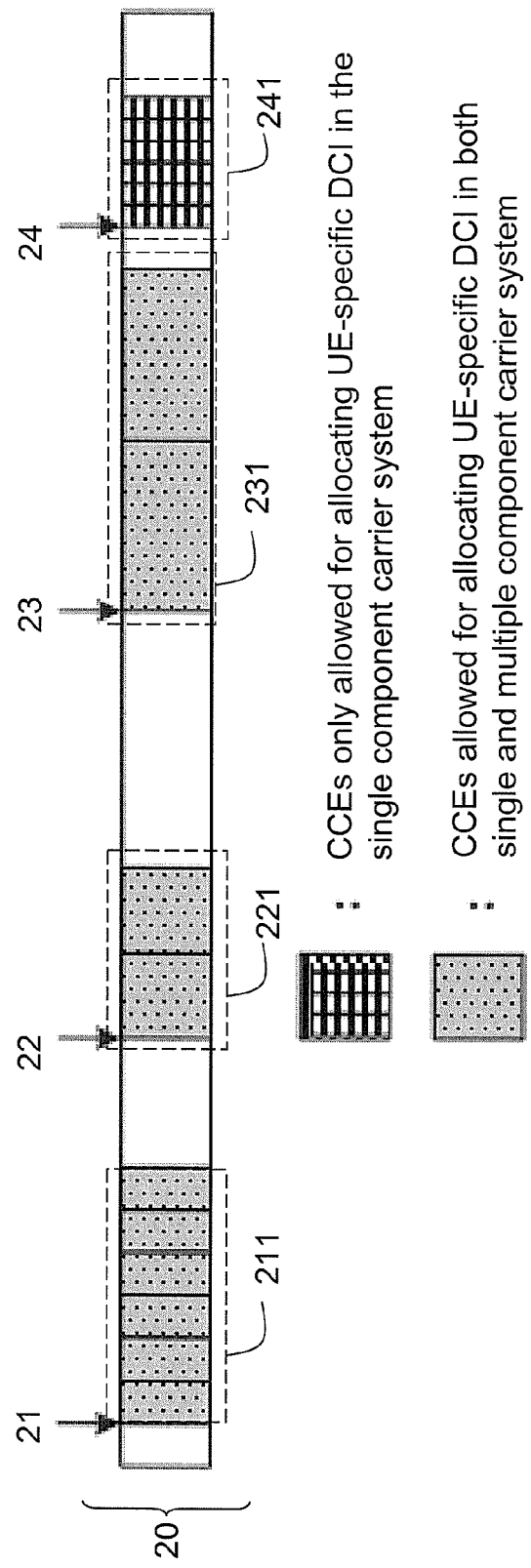
FIG. 2 is a schematic diagram illustrating an example of UE-specific search spaces reduced to (0, 6, 2, 2) according to a second exemplary embodiment.

FIG. 2 is a schematic diagram illustrating an example of UE-specific search spaces 20 reduced to (0, 6, 2, 2) according to the second exemplary embodiment. Referring to FIG. 2, the UE-specific search space 211 is the PDCCH candidates at aggregation level 2, where the initial position of the search space 211 is denoted as 21 in FIG. 2. The UE-specific search space 221 is the PDCCH candidates at aggregation level 4, where the initial position of the search space 221 is denoted as 22 in FIG. 2. The UE-specific search space 231 is the PDCCH candidates at aggregation level 8, where the initial position of the search space 231 is denoted as 23 in FIG. 2. The UE-specific search space 241 is the PDCCH candidates at aggregation level 1, where the initial position of the search space 241 is denoted as 24 in FIG. 2. In FIG. 2, the CCEs with checked pattern background are only allowed for allocating UE-specific DCIs in the single component carrier system. The CCEs with dotted pattern background are allowed for allocating UE-specific DCIs in the single or multiple component carrier system. In other words, the UE-specific search space is (a, b, c, d)=(6, 6, 2, 2) for single component carrier systems and (a, b, c, d)=(0, 6, 2, 2) for multiple component carrier systems.

[Third Exemplary Embodiment]

In a third exemplary embodiment, the extension of UE-specific search space except aggregation level 1 is proposed. It can also be extended to create new PDCCH format at other (or additional) aggregation level. In the third exemplary embodiment, the extended UE-specific search space is defined in Table 8, where $N_{BD}$ is the maximum number of PDCCH candidates for new monitoring format DCI (for example, $N_{BD}=16$), a is the number of PDCCH candidates of the aggregation level 1 (denoted as $l_1$ in Table 8), b is the number of PDCCH candidates of the aggregation level 2 (denoted as $l_2$ in Table 8), c is the number of PDCCH candidates of the aggregation level 4 (denoted as $l_3$ in Table 8), d is the number of PDCCH candidates of the aggregation level 8 (denoted as $l_4$ in Table 8), and e is the number of PDCCH candidates of an additional aggregation level $l_5$ (denoted as $l_5$ in Table 8). The initial points of PDCCH candidates can be derived from any hash function, for example, the hash function defined in LTE release-8 standard.

TABLE 8

Extended the UE-specific search space of additional aggregation level

| Type | Additional Blind Decoding for new format DCI | Aggregation level | Number of PDCCH candidates |
|---|---|---|---|
| UE-specific | $a + b + c + d + e$ ($a + b + c + d + e \leq N_{BD}$) | $l_1 = 1$<br>$l_2 = 2$<br>$l_3 = 4$<br>$l_4 = 8$<br>$l_5 \in \{3, 5, 6, 7\}$ or $l_5 > 8$ where $l_5 \in$ Integer | a, a ≥ 0<br>b, b ≥ 0<br>c, c ≥ 0<br>d, d ≥ 0<br>e, e ≥ 0 |

In Table 8, the values of a, b, c, d, e can be any integers greater than zero but restricted to the condition where $a+b+c+d+e \leq N_{BD}$, where $N_{BD}$ is the maximum number of PDCCH candidates for new format DCI (for example, $N_{BD}=16$). Also, the number of PDCCH candidates of an additional aggregation level $l_5$ can be selected from a set of 3, 5, 6, 7, or any integer greater than 8.

Figure 3:
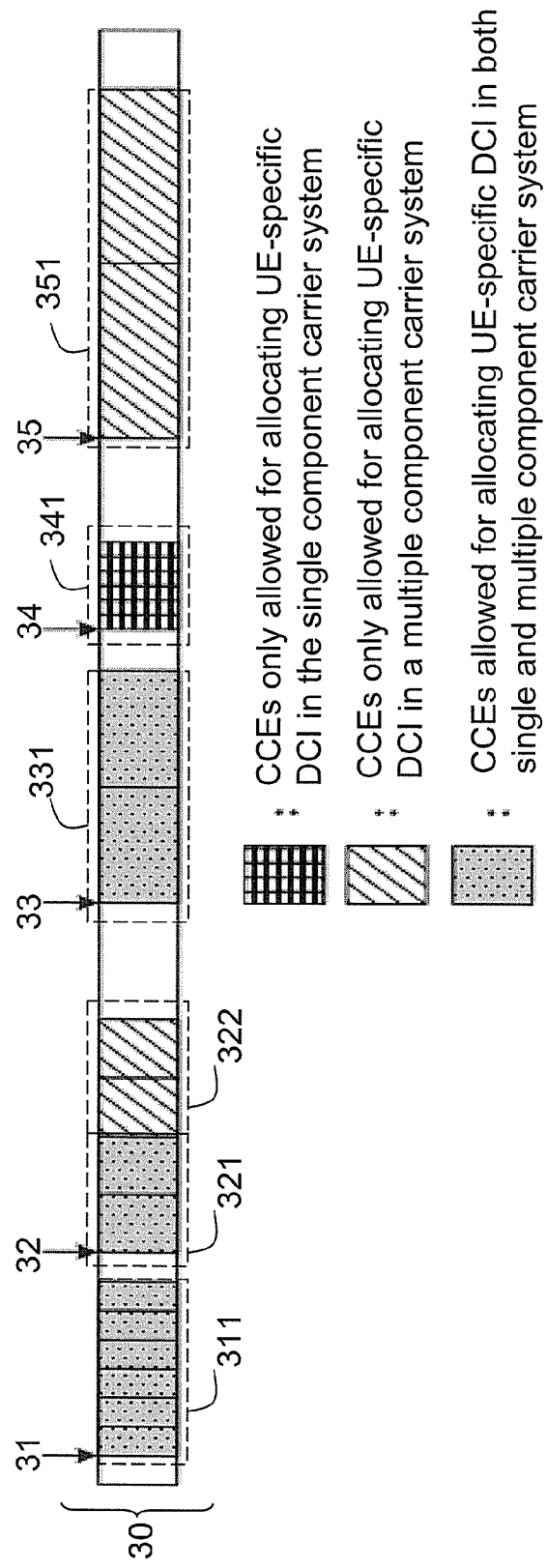
FIG. 3 is a schematic diagram illustrating an example of UE-specific search spaces reduced to (0, 6, 4, 2, 2) with a fifth aggregation level according to a third exemplary embodiment.

FIG. 3 is a schematic diagram illustrating an example of UE-specific search spaces 30 reduced to (0, 6, 4, 2, 2) with a fifth aggregation level $l_5=12$ according to the third exemplary embodiment. Referring to FIG. 3, UE-specific search space 311 is PDCCH candidates at aggregation level 2, where the initial position of the search space 311 is denoted as 31 in FIG. 3. UE-specific search space 321, 322 are PDCCH candidates at aggregation level 4, where the initial position of the search space 321 is denoted as 32 in FIG. 3. UE-specific search space 331 is PDCCH candidates at aggregation level 8, where the initial position of the search space 331 is denoted as 33 in FIG. 3. UE-specific search space 341 is PDCCH candidates at the aggregation level 1, where the initial position of the search space 341 is denoted as 34 in FIG. 3. UE-specific search space 351 is PDCCH candidates at the fifth aggregation level $l_5$, where the initial position of the search space 351 is denoted as 35 in FIG. 3.

In FIG. 3, the CCEs with checked pattern background are only allowed for UE-specific DCIs in a single component carrier system. The CCEs with diagonal strips pattern background are only allowed for allocating UE-specific DCIs in a multiple component carrier system. The CCEs with dotted pattern background are allowed for allocating UE-specific DCIs in both single and multiple component carrier systems. In other words, the UE-specific search space is (a, b, c, d)=(6, 6, 2, 2) for single component carrier systems, and the UE-specific search space is (a, b, c, d, e)=(0, 6, 4, 2, 2) for multiple component carrier systems.

[Fourth Exemplary Embodiment]

Uplink MIMO transmission is taken as an example in following disclosure. Although previous exemplary embodiments have been proposed to decrease the blind decoding attempts and blocking probability, the number of blind decoding may still be increased linearly with the number of aggregated carriers. In the fourth and the fifth exemplary embodiments, it is proposed to connect the linkage between the uplink grant command and corresponding component carriers for transmitting uplink MIMO grant command in multiple-component-carrier systems. It is noted that uplink grant command, downlink assignment, or power control command are all UE-specific information, and should be transmitted as UE-specific DCI.

Figure 4:
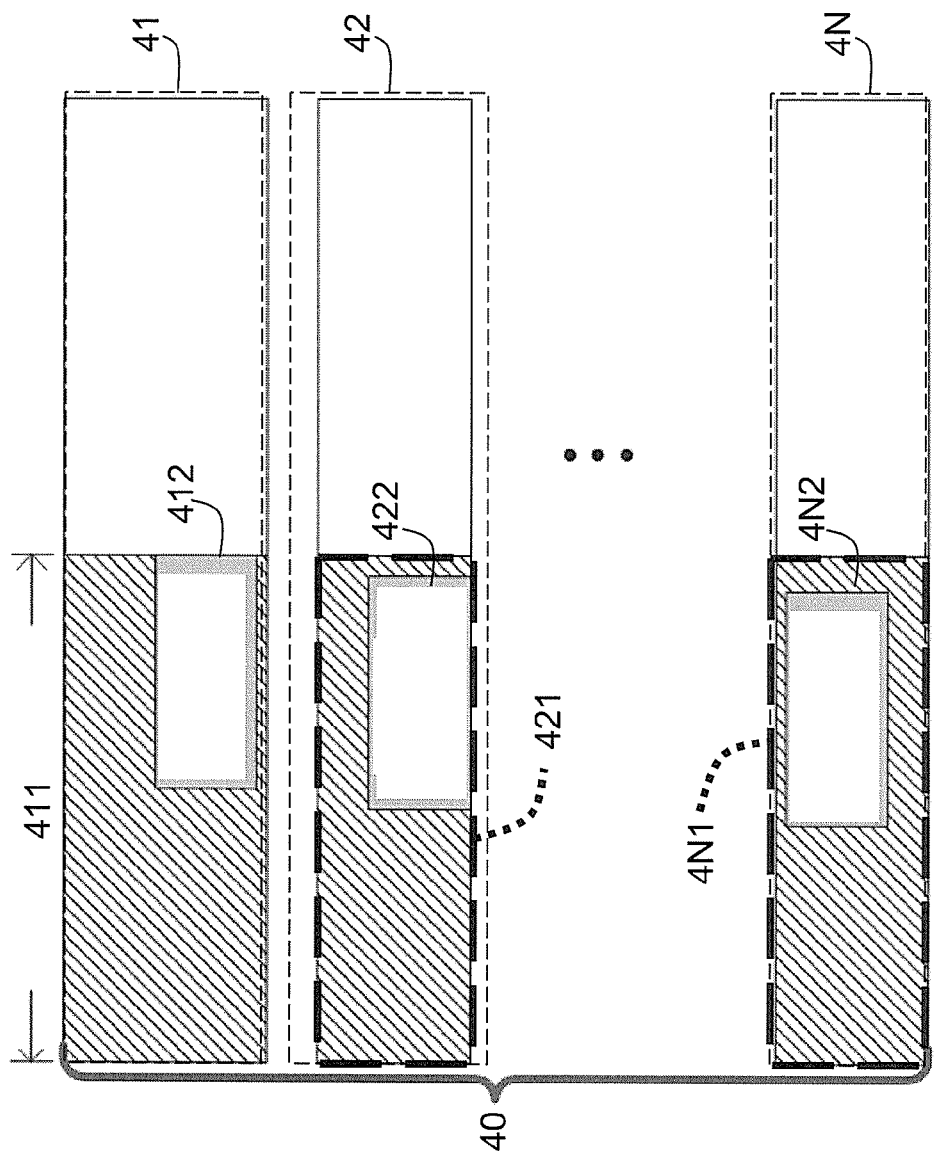
FIG. 4 is a schematic diagram illustrating a conventional approach of allocating uplink MIMO grant command.

FIG. 4 is a schematic diagram illustrating a conventional approach of allocating uplink MIMO grant command. Referring to FIG. 4, an multi-component-carrier signal 40 includes a plurality of component carriers 41, 42, . . . , 4N. In the conventional approach, the DCI for uplink MIMO grant command can be allocated in arbitrary downlink component carriers, such as the uplink MIMO DCI 412 allocated in a control region 411 of the downlink component carrier 41, the uplink MIMO DCI 422 allocated in a control region 421 of the downlink component carrier 42, . . . , and the uplink MIMO DCI 4N2 allocated in a control region 4N1 of the downlink component carrier 4N and so forth.

Figure 5:
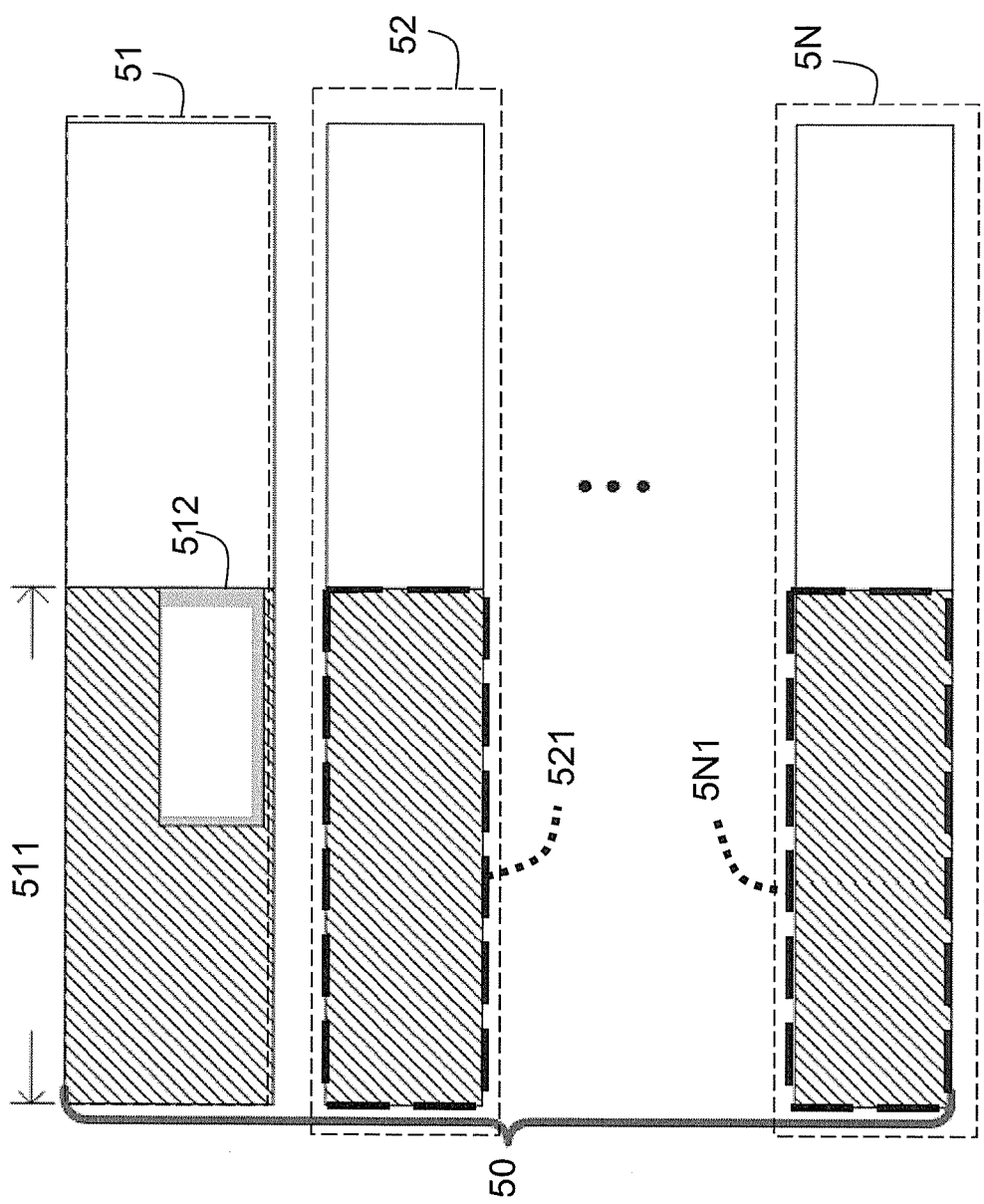
FIG. 5 is a schematic diagram illustrating a method of allocating uplink MIMO grant command according to a fourth exemplary embodiment.

FIG. 5 is a schematic diagram illustrating a method of allocating uplink MIMO grant command according to the fourth exemplary embodiment. RRC signalling could be used by a base station to inform the UEs of the primary component carrier or pre-configured component carrier. In the fourth exemplary embodiment, it is proposed that the uplink grant command for MIMO transmission will just be presented in the primary component carrier (or pre-configured component carrier). Therefore, each UE configured with uplink MIMO, within the coverage of a base station, monitors the uplink MIMO grant just in the primary component carrier or a pre-configured component carrier.

Referring to FIG. 5, a multi-component-carriers signal 50 includes a plurality of component carriers 51, 52, . . . , 5N. In the fourth exemplary embodiment, just one of all component carriers is allocated the uplink MIMO grant command such as the DCI 512 allocated in a control region 511 of the downlink component carrier 51, but the DCI for uplink MIMO grant command is not allocated in control regions 521, . . . , 5N1 of other downlink component carriers 52, . . . , 5N. The component carrier 51 is a primary component carrier in the multi-component-carriers signal 50.

In the fourth exemplary embodiment, the uplink MIMO grant can also be allocated just in a secondary component carrier (a pre-configured component carrier) rather than the primary component carrier in the multi-component-carriers signal 50. For example, the uplink MIMO DCI can only be allocated in a control region 521 of the component carrier 52, where the component carrier 52 is a secondary component carrier. But the DCI for uplink MIMO grant command is not allocated in control regions 511, 531, . . . , 5N1 of component carriers 51, 53, . . . , 5N.

In the fourth exemplary embodiment, the number of blind decoding attempts for the uplink MIMO grant is independent of the number of aggregated downlink component carriers. Thus, the number of blind decoding attempts is reduced. The DCI for uplink MIMO grant command being allocated in the primary component carrier or a pre-configured component carrier is just an example of the linkage between the uplink grant command and PUSCH for uplink MIMO transmission. The uplink grant command for MIMO transmission is allocated just in the primary or pre-configured component carrier.

However, the disclosure is not limited to the fourth exemplary embodiment, and in other embodiments, there can be N of aggregated component carriers in multi-component-carriers signals, where N is an integer greater than one.

[Fifth Exemplary Embodiment]

Figure 6:
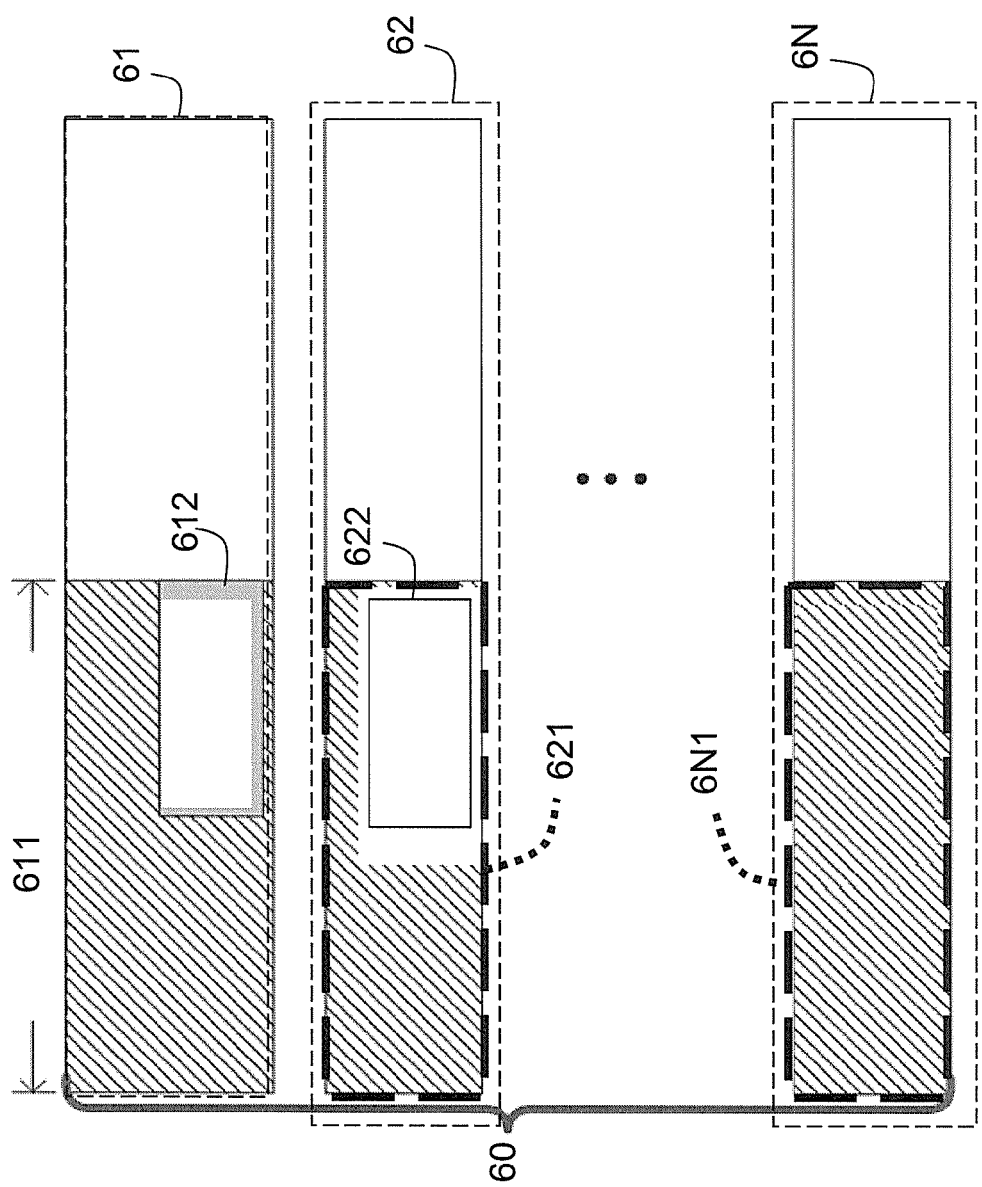
FIG. 6 is a schematic diagram illustrating a method of allocating uplink MIMO grant command according to a fifth exemplary embodiment.

FIG. 6 is a schematic diagram illustrating a method of allocating uplink MIMO grant command according to the fifth exemplary embodiment. Similar to method in the fourth exemplary embodiment, RRC signalling can be used by a base station to inform the UEs of a subset of pre-configured component carrier(s). In the fifth exemplary embodiment, it is proposed that the uplink grant command for MIMO transmission can just be presented in the subset of pre-configured component carrier(s). Therefore, the UE configured with uplink MIMO monitors the uplink MIMO grant command just in the pre-configured subset, and the number of blind decoding attempts for the uplink MIMO DCI is independent of the number of aggregated downlink component carriers. Thus, the number of blind decoding attempts is also reduced.

For example, referring to FIG. 6, a multi-component-carriers signal 60 includes a plurality of component carriers 61, 62, . . . , 6N. In the fifth exemplary embodiment, DCIs for uplink MIMO grant command are just allocated in the subset of all component carriers (in the multi-component-carriers signal 60), where the pre-configured subset of downlink component carriers includes the downlink component carrier 61 and the downlink component carrier 62. Since downlink component carrier 6N is not within the pre-configured subset, the uplink MIMO DCI is not allocated in control region 6N1 of downlink component carrier 6N. The component carrier 61 is a primary component carrier and the component carrier 62 is a secondary component carrier in the multi-component-carriers signal 60.

However, the disclosure is not limited to the fifth exemplary embodiment, and in other embodiments, there could be N of aggregated component carriers in multi-component-carriers signals, where N is an integer greater than one.

[Sixth Exemplary Embodiment]

Figure 7A:
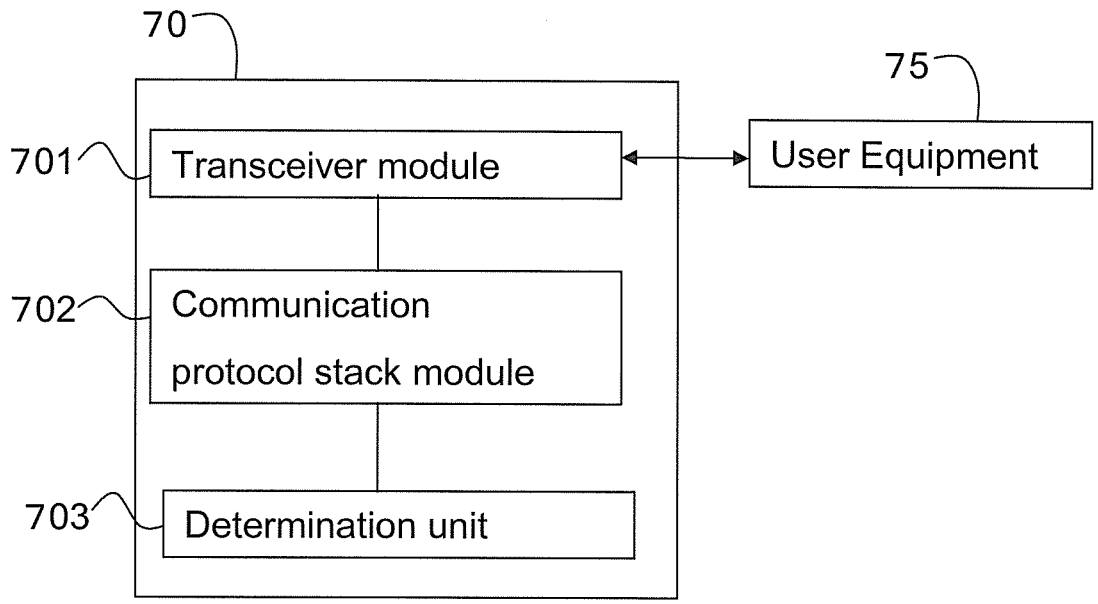
FIG. 7A is a block diagram illustrating an exemplary base station.
Figure 7B:
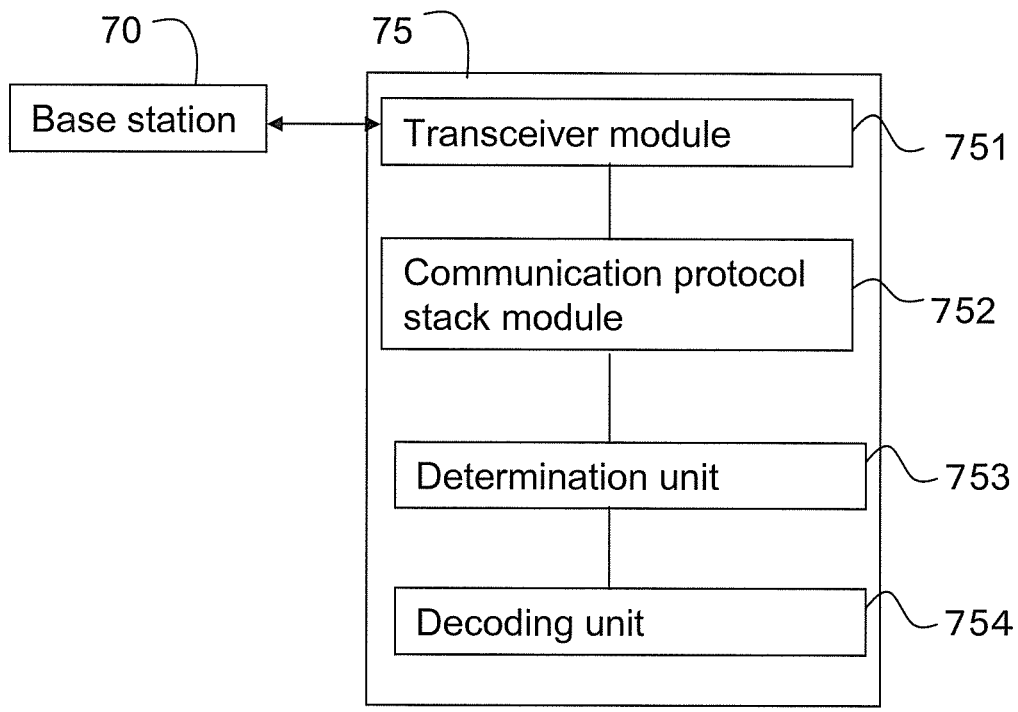
FIG. 7B is a block diagram illustrating an exemplary user equipment.

In the sixth exemplary embodiment, there are proposed structures of a base station and a UE. FIG. 7A is a block diagram illustrating an exemplary base station 70. The base station 70 is a communication apparatus, which can be used to perform channel allocation method in a multiple-component-carrier system according to following exemplary embodiments. FIG. 7B is a block diagram illustrating an exemplary user equipment (UE) 75. The UE 75 is a communication apparatus, which can be used to perform channel searching method in a multiple-component-carrier system according to following exemplary embodiments.

Referring to FIG. 7A, the base station 70 includes at least a transceiver module 701, a communication protocol stack module 702 and a determination unit 703. The base station 70 can be, for example, an enhanced node B (eNodeB), advanced base station (ABS), macro-cell, pico-cell, or remote radio head (RRH). The transceiver module 701 is configured for transmitting and receiving radio frequency (RF) signals. The multi-CC signals include a plurality of component carriers. The transmitted subframe from the transceiver module 701 includes the allocated UE-specific DCI and common control command. In addition, the transceiver module 701 communicates with the UE 75.

Referring to FIG. 7A, the communication protocol stack module 702 is connected to both transceiver module 701 and the determination unit 703. The communication protocol stack module 702 allocates UE-specific DCI and common DCI in a downlink subframe. The communication protocol stack module 702 transmits control region through the transceiver module 701. The communication protocol stack module 702 allocates uplink MIMO grant command in a pre-configured (or primary) component carrier or a pre-configured set of component carriers when the base station 70 is operating in a multi-CC system.

Referring to FIG. 7A, the determination unit 703 determines to encode a UE-specific DCI into one of the aggregation level $l_1$, $l_2$, $l_3$, $l_4$ and $l_5$ according to system bandwidth, UE SNR or SINR requirement on corresponding transmission mode. The numbers of UE-specific control channel candidates for aggregation levels $l_1$, $l_2$, $l_3$, $l_4$ and $l_5$ are respectively configured as a, b, c, d and e. The communication protocol stack module 702 is connected to the determination unit 703, and allocates the UE-specific DCI in the subframe by using the determined UE-specific search space. The transceiver module 701 is connected to the communication protocol stack module 702, and transmits the subframe including the allocated UE-specific DCI and common control command.

Referring to FIG. 7B, the UE 75 includes at least a transceiver module 751, a communication protocol stack module 752, a determination unit 753, and a decoding unit 754. The transceiver module 751 communicates with the base station 70. The UE 75 can be, for example, a mobile phone, a smartphone, a personal computer (PC), a notebook PC, a netbook PC, a tablet PC, a television, a set-top-box, a wireless data modem, a game console, a portable device, or a portable multimedia player. The transceiver module 751 receives and transmits radio frequency (RF) signal. The multi-CC signals include a plurality of component carriers. The received subframe from the base station 70 at the transceiver module 751 includes the allocated UE-specific DCI and common control command.

Referring to FIG. 7B, the communication protocol stack module 752 is connected to both transceiver module 751 and the decoding unit 753. The transceiver module 751 receives a control region from the base station. The communication protocol stack module 752 stores the received signal of the UE-specific search space. The determination unit 753 is connected to the communication protocol stack module 752. The determination unit 753 determines to decode the UE-specific DCI format in the UE-specific search spaces a, b, c, d and e corresponding to the aggregation levels $l_1$, $l_2$, $l_3$, $l_4$ and $l_5$. The decoding unit 754 is connected to the determination unit 753, and decodes the UE-specific DCI format by using the monitoring DCI formats, where the monitoring DCI formats are depending on transmission mode.

Referring to FIG. 7B, the communication protocol stack module 752 also monitors uplink MIMO grant command in a pre-configured (or primary) component carrier or a pre-configured set of component carriers if base station 70 is operating in a multi-component-carrier system. The communication protocol stack module 752 provides the uplink MIMO grant command to the determination unit 753.

[Seventh Exemplary Embodiment]

Figure 8:
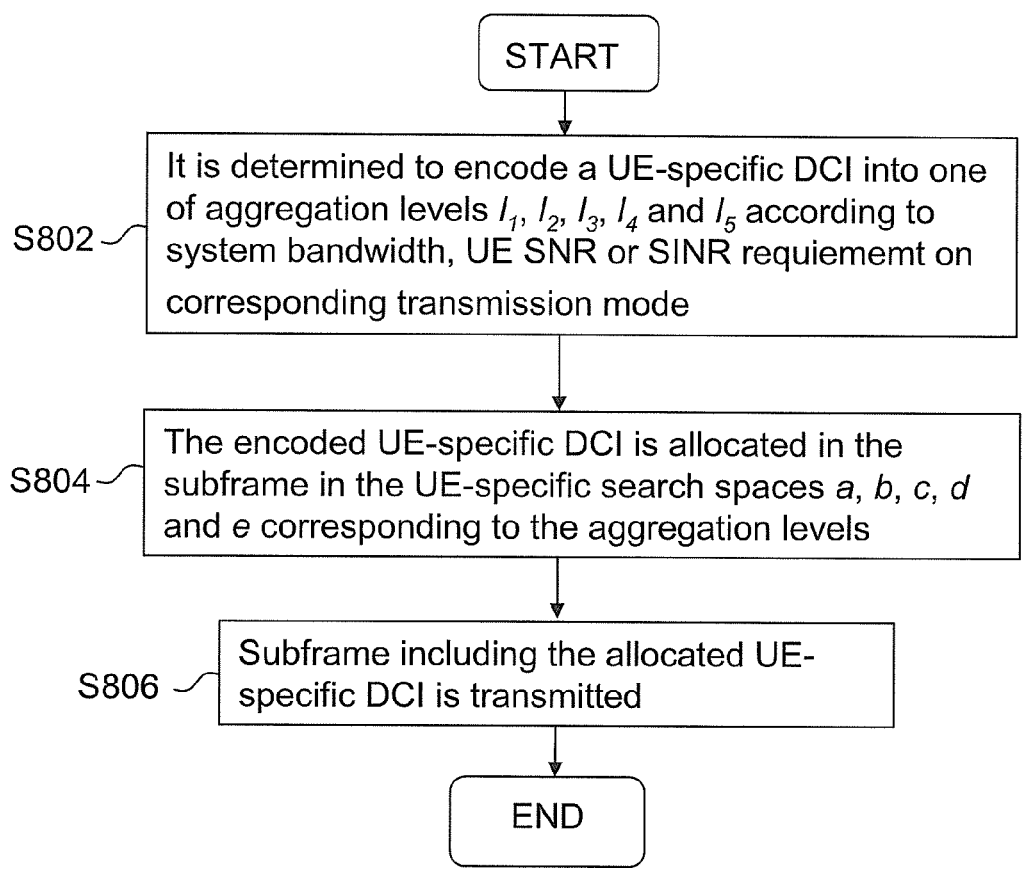
FIG. 8 is a flowchart illustrating a control channel allocation method according to a seventh exemplary embodiment.

FIG. 8 is a flowchart illustrating a control channel allocation method according to a seventh exemplary embodiment. The control channel allocation method can be applied in a communication system with multiple component carriers. Referring to both FIG. 7A and FIG. 8, the control channel allocation method starts from step S802. In the step S802, the determination unit 703 of the base station 70 determines to encode a UE-specific DCI into one of aggregation levels $l_1$, $l_2$, $l_3$, $l_4$ and $l_5$ according to at least system bandwidth, UE SNR or SINR requirement on corresponding transmission mode. In the step S804, the communication protocol stack module 702 allocates the encoded UE-specific DCI in the UE-specific search spaces a, b, c, d and e corresponding to the aggregation levels $l_1$, $l_2$, $l_3$, $l_4$ and $l_5$. The technical details of the aggregation levels $l_1$, $l_2$, $l_3$, $l_4$ and $l_5$ can be referred to the third exemplary embodiment and Table 8.

In the step S806, the transceiver module 701 transmits the subframe comprising the allocated UE-specific DCI. The control channel allocation method is terminated after the step S806. Also, in the seventh exemplary embodiment, the number of control channel candidates (a, b, c, d, e) respectively for the aggregation levels $l_1$, $l_2$, $l_3$, $l_4$ and $l_5$ can be, for example, (a, b, c, d, e)=(1, 2, 4, 6, 12), or (a, b, c, d, e)=(0, 6, 2, 2, 2), or (a, b, c, d, e)=(0, 6, 4, 2, 2).

[Eighth Exemplary Embodiment]

Figure 9:
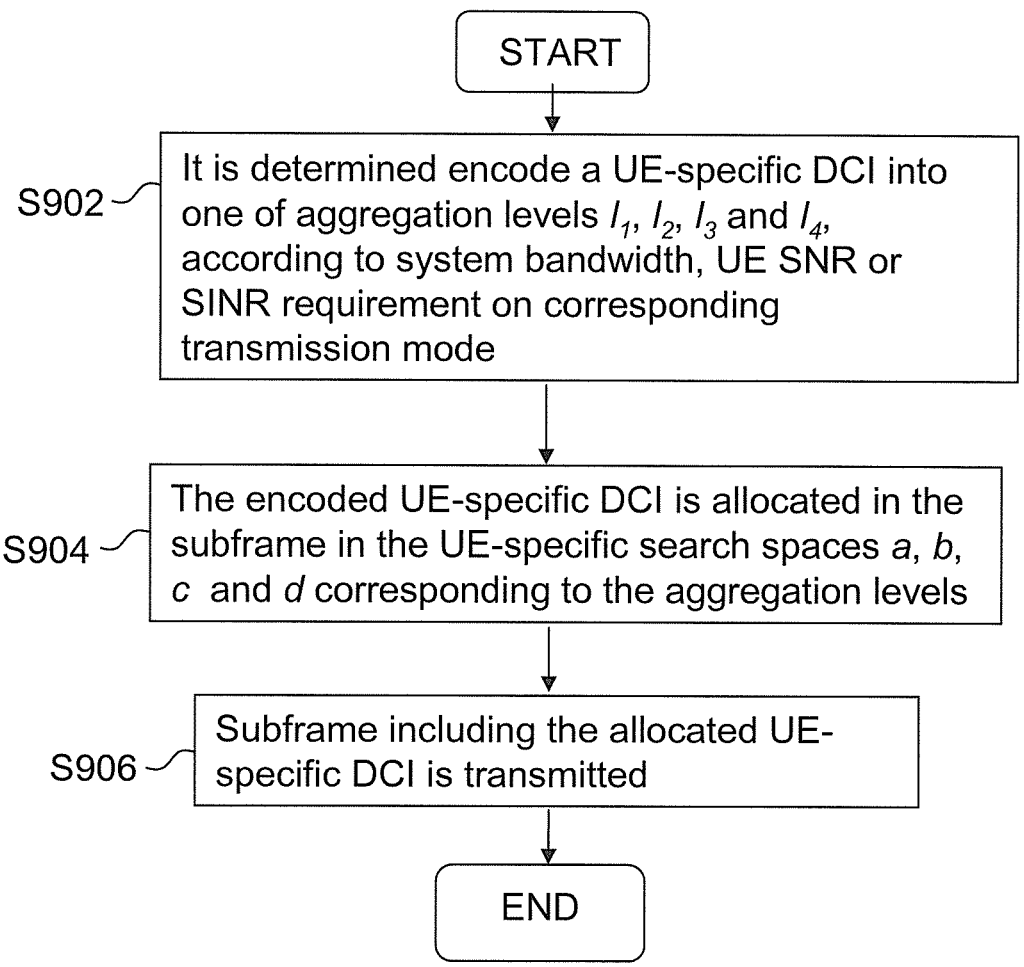
FIG. 9 is a flowchart illustrating a control channel allocation method according to an eighth exemplary embodiment.

FIG. 9 is a flowchart illustrating a control channel allocation method according to an eighth exemplary embodiment. The control channel allocation method can be applied in a communication system with multiple component carriers. Referring to both FIG. 7A and FIG. 9, the control channel allocation method starts from step S902. In the step S902, the determination unit 703 of the base station 70 determines to encode a UE-specific DCI into one of aggregation levels $l_1$, $l_2$, $l_3$ and $l_4$, according to system bandwidth, UE SNR or SINR requirement on corresponding transmission mode. The technical details of the aggregation levels $l_1$, $l_2$, $l_3$, and $l_4$ can be referred to the second exemplary embodiment, Table 6 and Table 7.

In step S904, the communication protocol stack module 702 allocates the encoded UE-specific DCI in the subframe in the UE-specific search spaces a, b, c and d corresponding to the aggregation levels $l_1$, $l_2$, $l_3$ and $l_4$. In step S906, the transceiver module 701 transmits the subframe comprising the allocated UE-specific DCI. The control channel allocation method is terminated after the step S906.

[Ninth Exemplary Embodiment]

Figure 10:
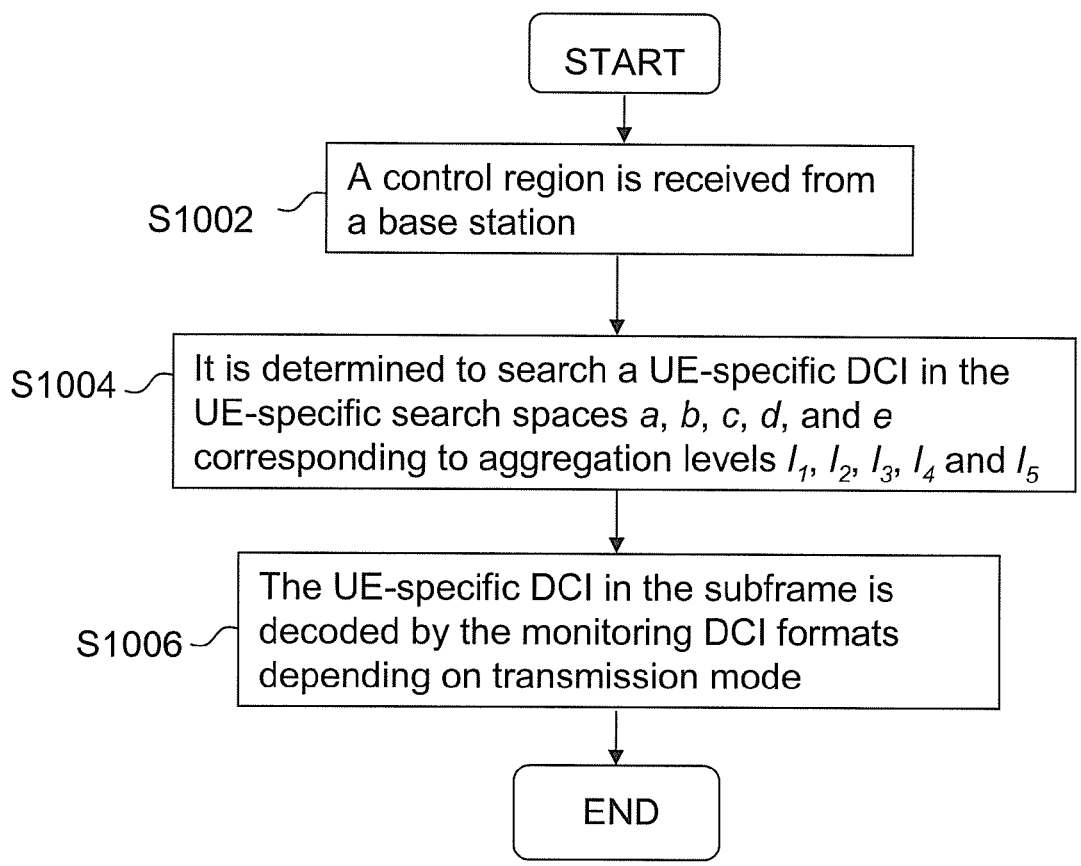
FIG. 10 is a flowchart illustrating a control channel searching method according to a ninth exemplary embodiment.

FIG. 10 is a flowchart illustrating a control channel searching method according to a ninth exemplary embodiment. The control channel searching method could be applied in a communication system with multiple component carriers, and is applied for the UE 75 to search for UE-specific DCI in a subframe from the base station 70. The control channel searching method starts from step S1002. Referring to FIG. 7B and FIG. 10, in the step S1002, the transceiver module 751 receives a control region from the base station 70 and its UE-specific search space is stored in the communication protocol stack module 752. The control region includes UE-specific DCIs, and is transmitted in the multi-component-carrier signal from the base station. In step S1004, the determination unit 753 determines to search a UE-specific DCI in the UE-specific search spaces a, b, c, d and e corresponding to aggregation levels $l_1, l_2, l_3, l_4$ and $l_5$. The technical details of the aggregation levels $l_1, l_2, l_3, l_4$ and $l_5$ can be referred to the third exemplary embodiment and Table 8.

In step S1006, the decoding unit 754 decodes the UE-specific DCI in the subframe by the monitoring DCI formats depending on transmission mode. The control channel searching method is terminated after the step S1006. Also, in the ninth exemplary embodiment, the aggregation levels $l_1$, $l_2, l_3, l_4$ and $l_5$ can be, for example, $l_2, l_3, l_4$ and $l_5$)=(1, 2, 4, 8, 12). Moreover, the number of control channel candidates (a, b, c, d, e) respectively for the aggregation levels $l_1, l_2, l_3$, $l_4$ and $l_5$ can be, for example, (a, b, c, d, e)=(0, 6, 2, 2, 2), or (a, b, c, d, e)=(0, 6, 4, 2, 2).

[Tenth Exemplary Embodiment]

Figure 11:
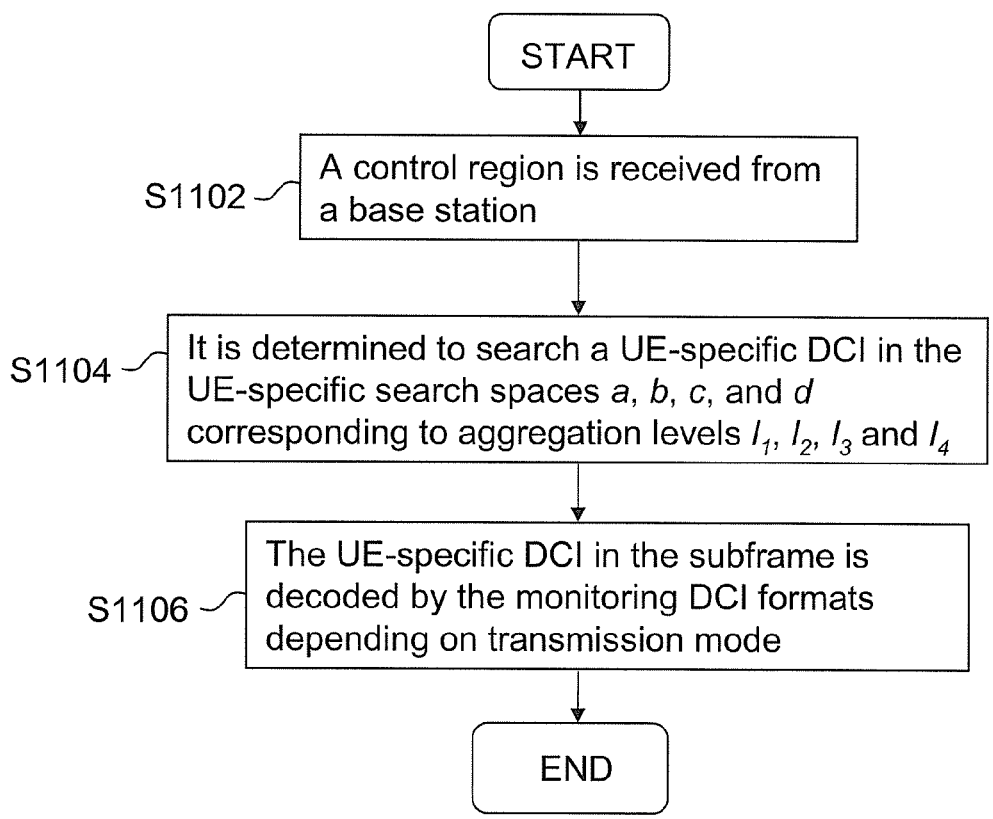
FIG. 11 is a flowchart illustrating a control channel searching method according to a tenth exemplary embodiment.

FIG. 11 is a flowchart illustrating a control channel searching method according to a tenth exemplary embodiment. The control channel searching method can be applied in a communication system with multiple component carriers, and is applied for the UE 75 to search for UE-specific DCI in a subframe from the base station 70. The control channel searching method starts from step S1102. Referring to FIG. 7B and FIG. 11, in the step S1002, the transceiver module 751 receives a control region from the base station 70 and its UE-specific search space is stored in the communication protocol stack module 752, where the control region includes UE-specific DCIs, and is transmitted in the multi-component-carrier signal from the base station. In step S1104, the determination unit 753 determines to search a UE-specific DCI in the UE-specific search spaces a, b, c and d corresponding to the aggregation levels $l_1, l_2, l_3$ and $l_4$. The technical details of the aggregation levels $l_1, l_2, l_3$, and $l_4$ can be referred to the second exemplary embodiment, Table 6 and Table 7.

In step S1106, the decoding unit 754 decodes the UE-specific DCI in the subframe by the monitoring DCI formats depending on transmission mode. The control channel searching method is terminated after the step S1106.

[Eleventh Exemplary Embodiment]

Figure 12:
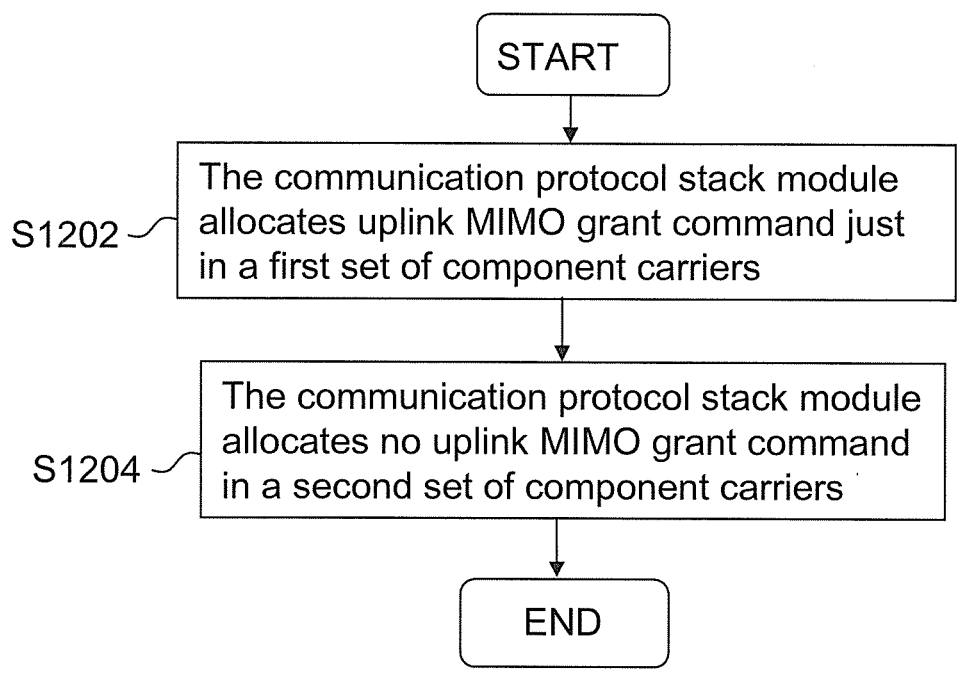
FIG. 12 is a flowchart illustrating a control channel allocation method according to an eleventh exemplary embodiment.

FIG. 12 is a flowchart illustrating a control channel allocation method for uplink MIMO grant according to an eleventh exemplary embodiment. The control channel allocation method can be applied for allocating uplink MIMO grant command in a multi-component-carrier communication system. The control channel allocation method starts from step S1202. Referring to FIG. 7A and FIG. 12, in the step S1202, the communication protocol stack module 702 of the base station 70 allocates uplink MIMO grant command just in a first set of component carriers. In step S1204, the communication protocol stack module 702 allocates no uplink MIMO grant command in a second set of component carriers, where the second set of component carriers includes at least one component carrier. The control channel allocation method for uplink MIMO grant is terminated after the step S1204.

In the eleventh exemplary embodiment, the first set of component carriers can be referred to the fourth and the fifth exemplary embodiments, where the first set of component carrier can be, for example, a primary component carrier, or a pre-configured secondary component carrier, or a set of pre-configured component carrier.

[Twelfth Exemplary Embodiment]

Figure 13:
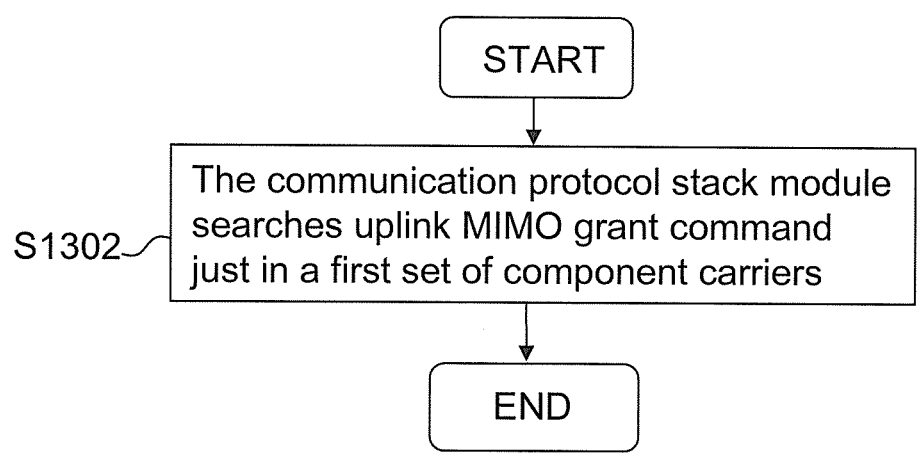
FIG. 13 is a flowchart illustrating a control channel searching method according to a twelfth exemplary embodiment.

FIG. 13 is a flowchart illustrating a control channel searching method for uplink MIMO grant command according to a twelfth exemplary embodiment. The control channel searching method can be applied for searching uplink MIMO grant command in a multi-component-carrier communication system. The control channel searching method for uplink MIMO grant command starts from step S1302. Referring to FIG. 7B and FIG. 13, in the step S1302, the communication protocol stack module 752 of the user equipment 75 searches uplink MIMO grant command just in a first set of component carriers. The control channel searching method for uplink MIMO grant command is terminated after the step S1302.

In the twelfth exemplary embodiment, the first set of component carriers can be referred to the fourth and the fifth exemplary embodiments, where the first set of component carrier can be, for example, a primary component carrier, or a pre-configured secondary component carrier, or a set of pre-configured component carrier.

In summary, according to the exemplary embodiments of the disclosure, a control channel allocation method, a control channel searching method and communication apparatuses using the same methods are proposed. By using flexible number of PDCCH candidates (or CCE candidates) in each one of the aggregation levels, or extending the number of aggregation levels, the number of blind decoding attempts for searching UE-specific DCI at receiving end can be reduced while maintaining reasonable decoding performance and DCI blocking probability. In addition, uplink MIMO grant command can be allocated in just a pre-configured (or primary) component carrier or a set of pre-configured component carriers.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A control channel allocation method, applied to allocate uplink multiple-input-multiple-output (MIMO) grant command in a communication system, with multiple component carriers, the method comprising:
   allocating downlink control information for at least one uplink MIMO grant command only in a first configurable set of component carriers but never allocating uplink MIMO grant command in a second configurable set of component carriers; and
   transmitting at least one signal comprising the downlink control information for the at least one uplink MIMO grant command in multiple component carriers in a downlink control channel, wherein the multiple component carriers aggregate the first configurable set of component carriers and the second configurable set of component carriers, wherein the at least one uplink MIMO grant command is in downlink control information format 4 for scheduling an uplink MIMO transmission.

2. The method according to claim 1, wherein the first configurable set of component carriers is a primary component carrier.

3. The method according to claim 1, wherein the first configurable set of component carriers is a pre-configured secondary component carrier.

4. The method according to claim 1, wherein the first configurable set of component carriers is a set of pre-configured component carriers.

5. A control channel searching method, applied for a UE to search uplink multiple-input-multiple-output (MIMO)

grant command in a communication system with multiple component carriers, the method comprising:

receiving at least one signal comprising downlink control information for the uplink MIMO grant command in multiple component carriers in a downlink control channel, wherein the multiple component carriers aggregate a first configurable set of component carriers and a second configurable set of component carriers; and monitoring at least one uplink MIMO grant command only in the first configurable set of component carriers but never monitoring uplink MIMO grant command in the second configurable set of component carriers, wherein the at least one uplink MIMO grant command is in downlink control information format 4 for scheduling an uplink MIMO transmission.

6. The method according to claim 5, wherein the first configurable set of component carriers is a primary component carrier.

7. The method according to claim 5, wherein the first configurable set of component carriers is a pre-configured secondary component carrier.

8. The method according to claim 5, wherein the first configurable set of component carriers is a set of pre-configured component carriers.

9. A communication apparatus, comprising:

a protocol stack hardware module, allocating downlink control information for at least one uplink multiple-input-multiple-output (MIMO) grant command only in a first configurable set of component carriers but never allocating uplink MIMO grant command in a second configurable set of component carriers; and a transceiver hardware module, connected to the protocol stack module, transmitting at least one signal comprising the downlink control information for the at least one uplink MIMO grant command in multiple component carriers in a downlink control channel, wherein the multiple component carriers aggregate the first configurable set of component carriers and the second configurable set of component carriers, wherein the at least one uplink MIMO grant command is in downlink control information format 4 for scheduling an uplink MIMO transmission.

10. The apparatus according to claim 9, wherein the first configurable set of component carriers is a primary component carrier.

11. The apparatus according to claim 9, wherein the first configurable set of component carriers is a pre-configured secondary component carrier.

12. The apparatus according to claim 9, wherein the first configurable set of component carriers is a set of pre-configured component carriers.

13. The apparatus according to claim 9, wherein the communication apparatus is an enhanced node B (eNodeB), advanced base station (ABS), macro-cell, pico-cell, or remote radio head (RRH).

14. A communication apparatus, applied to search uplink MIMO grant command in a subframe from a base station in a communication system with multiple component carriers, the apparatus comprising:

a transceiver hardware module, receiving at least one signal comprising downlink control information for the uplink multiple-input-multiple-output (MIMO) grant command in multiple component carriers in a downlink control channel, wherein the multiple component carriers aggregate a first configurable set of component carriers and a second configurable set of component carriers; and a protocol stack hardware module, monitoring at least one uplink MIMO grant command only in the first configurable set of component carriers but never monitoring uplink MIMO grant command in the second configurable set of component carriers, wherein the at least one uplink MIMO grant command is in downlink control information format 4 for scheduling an uplink MIMO transmission.

15. The apparatus according to claim 14, wherein the first configurable set of component carriers is a primary component carrier.

16. The apparatus according to claim 14, wherein the first configurable set of component carriers is a pre-configured secondary component carrier.

17. The apparatus according to claim 14, wherein the first configurable set of component carriers is a set of pre-configured component carriers.

18. The apparatus according to claim 14, wherein the communication apparatus is a user equipment (UE), a mobile phone, a smartphone, a personal computer (PC), a notebook PC, a netbook PC, a tablet PC, a television, a set-top-box, a wireless data modem, a game console, a portable device, or a portable multimedia player.

* * * * *